United States Patent
Bouman

[11] 3,886,438
[45] May 27, 1975

[54] VOLTAGE-REGULATED POWER SUPPLY UNIT

[75] Inventor: Antonius Fredericus Mattias Bouman, Hengelo, Netherlands

[73] Assignee: Hollandse Signaalapparaten B.V., Hengelo, Netherlands

[22] Filed: Sept. 24, 1973

[21] Appl. No.: 399,857

[30] Foreign Application Priority Data
Sept. 26, 1972 Netherlands............... 7212971

[52] U.S. Cl................ 323/22 T; 307/44; 321/18; 323/25
[51] Int. Cl. ............... G05f 1/56; G05f 1/64
[58] Field of Search .......... 307/43, 44, 69; 321/18; 323/22 T, 23, 25

[56] References Cited
UNITED STATES PATENTS
3,414,802   12/1968   Harrigan et al................ 307/44 X FOREIGN PATENTS OR APPLICATIONS
1,513,433   2/1970   Germany ..................... 323/25

OTHER PUBLICATIONS

Tenley, Power Line Disturbance Support Circuit, IBM Technical Disclosure Bulletin, Vol. 14, No. 1, June 1971, pages 68, 69.

Primary Examiner—A. D. Pellinen
Attorney, Agent, or Firm—Frank R. Trifari; Bernard Franzblau

[57] ABSTRACT

Voltage-regulated power supply unit provided with first and second d.c. voltage sources of different voltage levels and first and second regulators. The first regulator delivers a stabilised output voltage. In general, the input voltage of the first regulator is derived from the first source. However, if the output voltage of the first source drops below the working voltage of the first regulator, an additional supply of energy is provided by the second source via the second regulator. A smoothing filter having a certain ripple factor, is inserted in the first source, thus increasing the efficiency of the supply unit.

10 Claims, 11 Drawing Figures

Fig. 3A  $\eta = \dfrac{V_u \cdot I_u}{V_{1br} \cdot a I_u + V_{2br} \cdot (1-a) \cdot I_u} = \dfrac{V_u}{(a - ea + e) V_{1br}}$ Fig. 3B  $\eta = \dfrac{V_u \cdot I_u}{(V_{1br} \cdot I_1 + V_{2br} \cdot I_2) + V_{2br} \cdot (1-a) I_u} =$ $= \dfrac{-I_u \cdot V_u \cdot R_{tr1}}{k \cdot V_{1br}^2 - l \cdot V_{1br}}$ Fig. 3C  $\eta = \dfrac{V_u}{e V_{1br}}$ Fig. 3D  $\eta = \dfrac{2}{T} \displaystyle\int_0^{T/2} \dfrac{V_u}{(e-ka) \cdot V_t}\, dt =$ $= \dfrac{V_u}{2c(e-ka)V_m} \cdot \ln\left(\dfrac{1+c}{1-c}\right)$ Fig. 3E  $\eta = \dfrac{2}{T} \displaystyle\int_0^{T/2 - \tau_c} \dfrac{-I_u \cdot V_u \cdot R_{tr1}}{k V_t^2 - l V_t}\, dt +$ $+ \dfrac{2}{T} \displaystyle\int_{T/2 - \tau_c}^{T/2} \dfrac{V_u}{(e-ka) V_t}\, dt =$ $= \dfrac{I_u \cdot V_u \cdot R_{tr1}}{2c \cdot l \cdot V_m} \cdot \ln\left[\dfrac{\{l - k(1-c)V_m\} V_c}{(l - k V_c)(1-c)V_m}\right] +$ $+ \dfrac{V_u}{2c \cdot (e-ka) V_m} \cdot \ln\left\{\dfrac{(1+c)V_m}{V_c}\right\}$ Fig. 3F $\quad \eta = \dfrac{2}{T}\displaystyle\int_0^{\tau_o} \dfrac{V_u}{eV_t}\,dt + \dfrac{2}{T}\displaystyle\int_{\tau_o}^{T/2-\tau_c} \dfrac{-I_u \cdot V_u \cdot R_{tr1}}{kV_t^2 - lV_t}\,dt +$ $\qquad\qquad + \dfrac{2}{T}\displaystyle\int_{T/2-\tau_c}^{T/2} \dfrac{V_u}{(e-ka)V_t}\,dt =$ $\qquad\qquad = \dfrac{V_u}{2ceV_m}\ln\left\{\dfrac{V_o}{(1-c)V_m}\right\} + \dfrac{I_u \cdot V_u \cdot R_{tr1}}{2clV_m}\ln\left\{\dfrac{(l-kV_o)V_c}{(l-kV_c)V_o}\right\} +$ $\qquad\qquad + \dfrac{V_u}{2c(e-ka)V_m}\ln\left\{\dfrac{(1+c)V_m}{V_c}\right\}$ Fig. 3G $\quad \eta = \dfrac{V_u}{2ceV_m}\ln\left(\dfrac{V_o}{(1-c)V_m}\right) +$ $\qquad\qquad + \dfrac{I_u \cdot V_u \cdot R_{tr1}}{2clV_m}\ln\left[\dfrac{(l-kV_o)(1+c)V_m}{V_o\{l-k(1+c)V_m\}}\right]$ Fig. 3H $\quad \eta = \dfrac{V_u}{2ceV_m}\ln\left(\dfrac{1+c}{1-c}\right)$

VOLTAGE-REGULATED POWER SUPPLY UNIT

The invention relates to a voltage-regulated power supply unit provided with a first voltage source producing a fluctuating d.c. voltage, a first regulator connected thereto, and a feedback circuit connected to the output of said regulator, which feedback circuit comprises a first comparator providing a control voltage related to the difference between the output voltage and a fixed reference voltage in order to regulate said output voltage.

Such voltage-regulated power supply units are commonly known and are put on the market in various embodiments. In power supply units of the abovementioned type, the d.c. voltage produced by the first voltage source should have a relatively high value in comparison with the output voltage provided by said first regulator in order that unexpectedly large fluctuations in the d.c. voltage produced by said voltage source will not cause said regulator to become inoperative, thus causing the output voltage of this regulator to drop out. The disadvantage attached to the use of a relatively high output voltage of said first regulator is the low efficiency, usually not exceeding 40 percent.

It is therefore an object of the present invention to provide a voltage-regulated power supply unit of the above-mentioned type in which the efficiency of the power supply unit is considerably increased.

According to the present invention, the voltage-regulated power supply unit of the above-mentioned type is provided with a second d.c. voltage source, and a second regulator, which establishes a connection between the second voltage source and the first regulator during the time when the second regulator is registering a voltage generated by the first voltage source, which voltage is below the sum value of the required minimum operating voltage of the first regulator and said output voltage, for the purpose of maintaining a d.c. voltage which is at least equal to said sum value and is to be supplied to the first regulator.

The invention and its advantages will be further described with reference to the attached drawings, in which.

Figure 4:
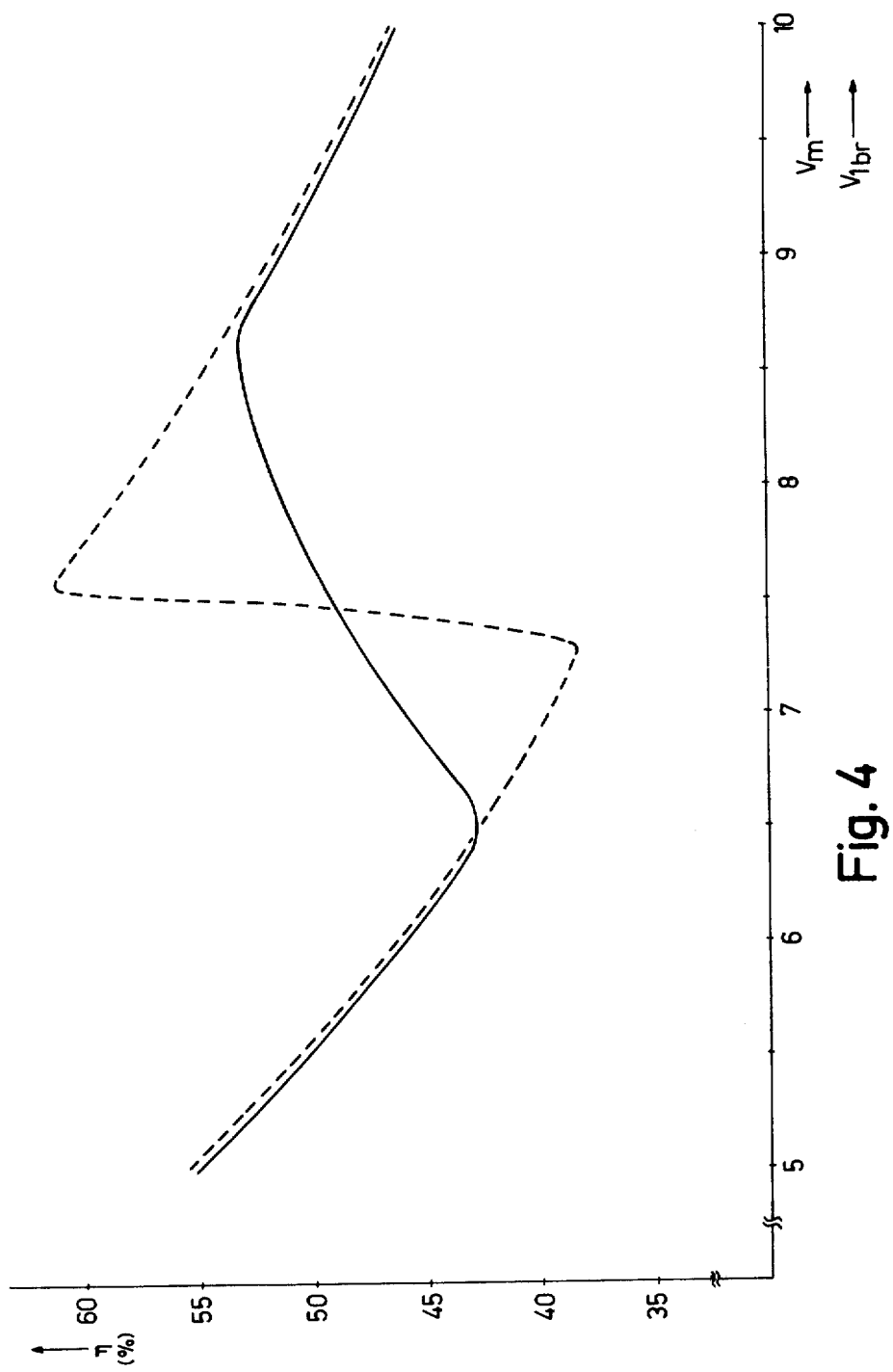

FIGS. 3A – H show a series of formulae for the efficiency of said power supply unit under different conditions; and FIG. 4 illustrates efficiency characteristics of said power supply unit.

Figure 1:
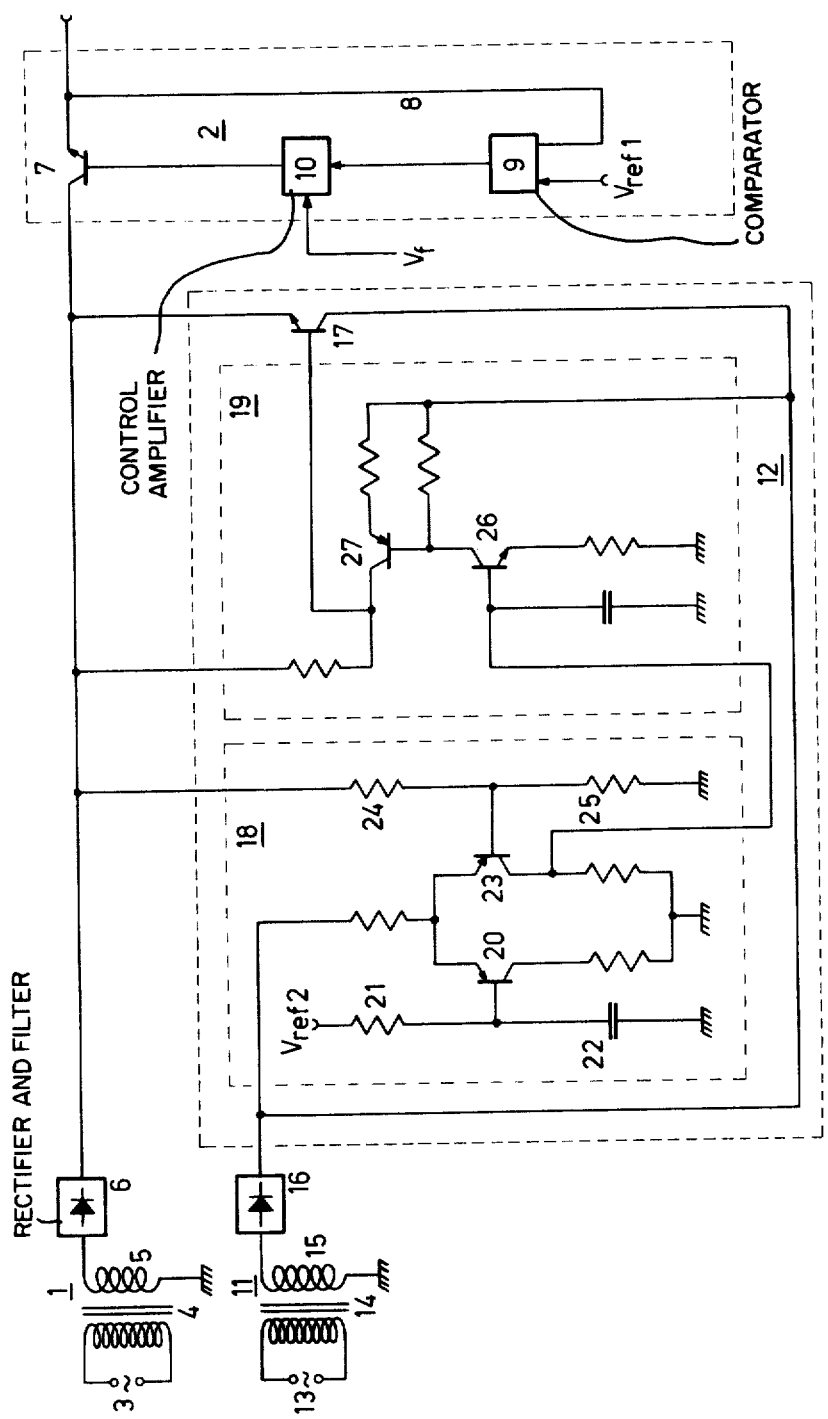
FIG. 1 illustrates an embodiment of a voltage-regulated power supply unit according to the invention.

FIG. 1 illustrates a voltage-regulated power supply unit provided with a d.c. voltage source 1 and a regulator 2. In the embodiment in question the voltage source 1 comprises a transformer 4 connected to an a.c. voltage source 3, and a rectifier circuit 6 inserted in the secondary 5 of the transformer 4. This rectifier circuit is preferably composed of a rectifier and a smoothing filter. These components are, however, not shown separately in this figure. The regulator 2 should be so controlled that it only supplies a fixed output voltage. In the embodiment in question, this regulator comprises a power transistor 7 and a feedback circuit 8 from the emitter to the base of this transistor, said feedback circuit containing successively a comparator 9 and a control amplifier 10. The collector of transistor 7 is connected to the rectifier circuit 6. In the comparator 9 said output voltage is compared with a fixed reference voltage $V_{ref1}$, which may give rise to the generation of a control voltage to be amplified in the control amplifier 10. The voltage thus obtained is fed to the base of said power transistor. In this way, the requirement that no fluctuations may occur in said output voltage is fulfilled.

Despite the incorporation of the regulator 2 and the feedback circuit 8 in the power supply unit, it could happen that the output voltage of the regulator 2 assumes, for a short period, a value which is lower than the desired fixed voltage value. This may occur if the a.c. voltage required for the transformer 4 contains such aperiodic fluctuations that the voltage delivered by the rectifier circuit 6 drops, for a certain time, to a level below the critical value determined by the sum of the fixed regulator 2 output voltage controlled by the feedback circuit 8 and the minimum operating voltage of the power transistor 7. The latter voltage is usually called the "saturation" voltage. This difficulty could be overcome by dimensioning the components of the d.c. voltage source 1 in such a way that the momentary voltage supplied by this source can never assume a value which is below said critical value. However, a power supply unit thus dimensioned has a low efficiency.

A particularly efficient voltage-regulated power supply unit, which can be used to advantage, is obtained if the power supply unit according to the invention is provided with a second d.c. voltage source 11 and a second regulator 12. As in the case of the first d.c. voltage source 1, in the embodiment in question the second d.c. voltage source 11 also comprises a transformer 14 connected to an a.c. voltage source 13 and a rectifier circuit 16 inserted in the secondary 15 of the transformer 14. However, the components contained in the second d.c. voltage source are so dimensioned that the level of the terminal voltage supplied by the source 11 will always be higher than that generated by source 1. The components to be applied in the power supply unit according to the present invention should be used primarily to establish if necessary, a connection between the voltage source 11 and the part of the secondary 5 lying between the rectifier circuit 6 and the regulator 2, thus achieving that the desired level of the d.c. voltage supplied to the regulator 2 be maintained. It should, however, be ensured that the efficiency of the power supply unit does not decrease excessively. In principle, the second d.c. source 11 and the second regulator 2 should therefore be applied only if the first regulator 2 needs an additional supply of electrical energy. The effect will be that the efficiency of the power supply unit is kept as high as possible.

Furthermore, in the embodiment in question, the reference voltage $V_{ref1}$ for the comparator 9 and the supply voltage $V_f$ for the control amplifier 10 are derived direct from the second voltage source 11.

It should be noted that in the embodiment in question the two transformers 4 and 14 are combined in such a way that there are two secondaries, but only one primary. The result is that a drop in the output voltage of the rectifier circuit 6 is associated with a drop in the output voltage of rectifier circuit 16 so that, in case of an additional supply of energy by the second d.c. source 11, due account must be paid to the application of a practically proportional reduction of the momentary output voltage of the rectifier circuit 16 in calculating the efficiency. Consequently, the efficiency of the power supply unit will still assume a reasonable value during the additional energy supply by the second voltage source 11.

In the embodiment in question the second regulator 12 comprises a power transistor 17 of the NPN type, of which the collector is connected to the second d.c. voltage source 11, while the emitter of transistor 17 is connected to the part of the secondary 5 lying between the rectifier circuit 6 and the regulator 2. In this way it is possible to keep the base potential of transistor 17 at a fixed value with a varying emitter voltage of this transistor, so that the regulator 12 is controlled by means of the then varying base-emitter voltage. However, a more efficient power supply unit, which can be used to advantage, is obtained if the second regulator 12 of such a power supply incorporates also a second comparator 18, in which the voltage impressed on the part of the secondary 5 lying between the rectifier circuit 6 and regulator 2 is compared with a fixed reference voltage ($V_{ref2}$), and if the regulator 12 further comprises a two-stage control amplifier 19 through which a control signal derived from comparator 18 is supplied to the base input of the power transistor 17. In the embodiment in question, the reference voltage ($V_{ref2}$), required for the second comparator 18, is derived from the output voltage of the regulator 2, while a differential amplifier provided with PNP transistors is employed as comparator 18, for which the d.c. voltage supplied by the second voltage source 11 is utilised as the supply voltage. The fixed reference voltage ($V_{ref2}$) is applied, through an integrating network consisting of a resistor 21 and a capacitor 22, to the base input of a first transistor 20 of the comparator 18. This will prevent any fluctuations in the output voltage of the regulator 2 from influencing the base voltage of transistor 20 which would thus disturb the stability of said control signal derived from the comparator 18. The base voltage of transistor 23 of the comparator 18 is controlled with the aid of a circuit comprising resistors 24 and 25, across which circuit the voltage delivered by the rectifier circuit 6 is impressed. The transistorised two-stage control amplifier 19 comprises a first stage 26, for which the supply voltage is derived from the d.c. voltage supplied by the second voltage source 11, and the control voltage from the collector voltage of transistor 23. The second stage 27 of the two-stage control amplifier 19 is supplied with a voltage derived from the difference between the two voltages delivered by the voltage sources 1 and 11, and with a control voltage derived from the collector of the first stage 26. It should be noted that the voltages mentioned above and those mentioned hereafter are defined with respect to ground potential. The collector voltage of the second stage 27 is applied as a control voltage to the base input of the power transistor 17. If now the output voltage of the rectifier circuit 6 decreases, the following occurs:

The base voltage of transistor 23 decreases accordingly, causing the collector voltage of this transistor to increase. Consequently, the collector voltage of the transistor of the first control stage 26, and therefore also the base voltage of the transistor of the second control stage 27, will be decreased. In this way, the collector voltage of the transistor of the second stage 27 and hence the base voltage of the power transistor 17 will increase. The rise of the base voltage of said power transistor and the drop of the emitter voltage (obtained via the secondary 5) of this transistor 17 will result in a strong increase of the emitter current causing the voltage across the part of the secondary 5 between the rectifier circuit 6 and the regulator 2 to increase to a value which is at least equal to said critical voltage.

A voltage-regulated power supply unit as described above keeps any fluctuations in the efficiency at a small value; this will be described in more detail with reference to the aforementioned figures. In this description the energy dissipation of some components of the power supply unit will be neglected since their contribution to the energy dissipation of the complete power supply unit is relatively very small. This also applies to the following components: the first comparator 9, the control amplifier 10, the second comparator 18 and the two-stage control amplifier 19. Furthermore, in the following description the output voltage $V_u$ of the power supply unit, as well as the respective current $I_u$, is assumed to be constant. The current relative to the output power of a power supply unit corresponds, as shown in FIG. 1, with the emitter current $I_u$ to be delivered by the power transistor 7. The base current quantified as $(1-a) \cdot I_u$, where $0 < a < 1$, may be regarded as a drive current required for a power transistor. This drive current is obtained from the second d.c. voltage source 11 in the embodiment in question. The collector current ($a \cdot I_u$) of this transistor is fully drawn from the first d.c. voltage source 1, so long as the voltage supplied by the rectifier circuit 6 is not less than the sum of said output voltage $V_u$ and the saturation voltage $V_s$ to be regarded as the minimum working voltage of transistor 7. If the voltage delivered by the rectifier circuit 6 is completely smoothed, this voltage will be equal to:

$$V_{1br} - V_d - R_{tr1} \cdot I_1,$$

where $V_{1br}$ equals the r.m.s. source voltage of the first transformer 4, $V_d$ the voltage drop across the rectifier circuit 6, and $R_{tr1} \cdot I_1$ the loss factor in the transformer 4, which factor is determined by the internal resistance $R_{tr1}$ and the transformer current $I_1$. If $V_{1br} \geq V_c$, where $V_c = V_d + V_s + V_u + aI_u \cdot R_{tr1}$, and $aI_u$ is identical to the transformer current $I_1$, then the efficiency $\eta$ of the power supply unit is given by the expression of FIG. 3A. In this expression e is defined as the quotient of $V_{2br}$ and $V_{1br}$, representing the transformer ratio on the secondary, and $V_{2br}$ equals the r.m.s. source voltage of the second transformer 14.

If, however, the output voltage of the rectifier 6 does not fulfill the condition $V_{1br} \geq V_c$, an additional supply of energy is necessary. This occurs with the aid of the second d.c. voltage source 11, an additional condition being however that $I_1 > 0$, from which it can be derived that $V_{1br} > V_0$, where $V_0 = V_d + V_s + V_u$. In such a case, the collector current $aI_u$ of the power transistor 7 will be composed of the currents $I_1$ and $I_2$ drawn from the voltage sources 1 and 11 respectively. The relevant efficiency $\eta$ of this power supply unit will then be given by the expression of FIG. 3B, where:

$k = (e - 1)$
$l = k(V_d + V_s + V_u) + eI_u \cdot R_{tr1}$ and
$I_1 = (V_{1br} - V_d - V_s - V_u)/R_{tr1}$.

However, if the voltage of the first voltage source 1 were to drop to such a value that $V_{1br} \leq V_0$, then the entire collector current ($aI_u$) of the power transistor 7 is drawn from the second voltage source 11, and the respective efficiency $\eta$ of the power supply unit is given by the expression of FIG. 3C. In FIG. 4 the dashed line represents the efficiency characteristic of a power supply unit as illustrated in FIG. 1. This characteristic is derived with the aid of the formulae of FIGS. 3A - 3C, which apply only if the voltage delivered by the rectifier circuit 6 has been completely smoothed. The following parameter values were used:

$V_d = 1.1$ volt
$e = 1.8$
$R_{tr1} = 0.012 \, \Omega$
$V_s = 1.2$ volt
$a = 0.9$
$V_u = 5$ volt
$I_u = 25$ A It should be noted that the characteristic varies considerably in the relatively small range:

$$V_o < V_{1br} \leq V_c.$$

Figure 2:
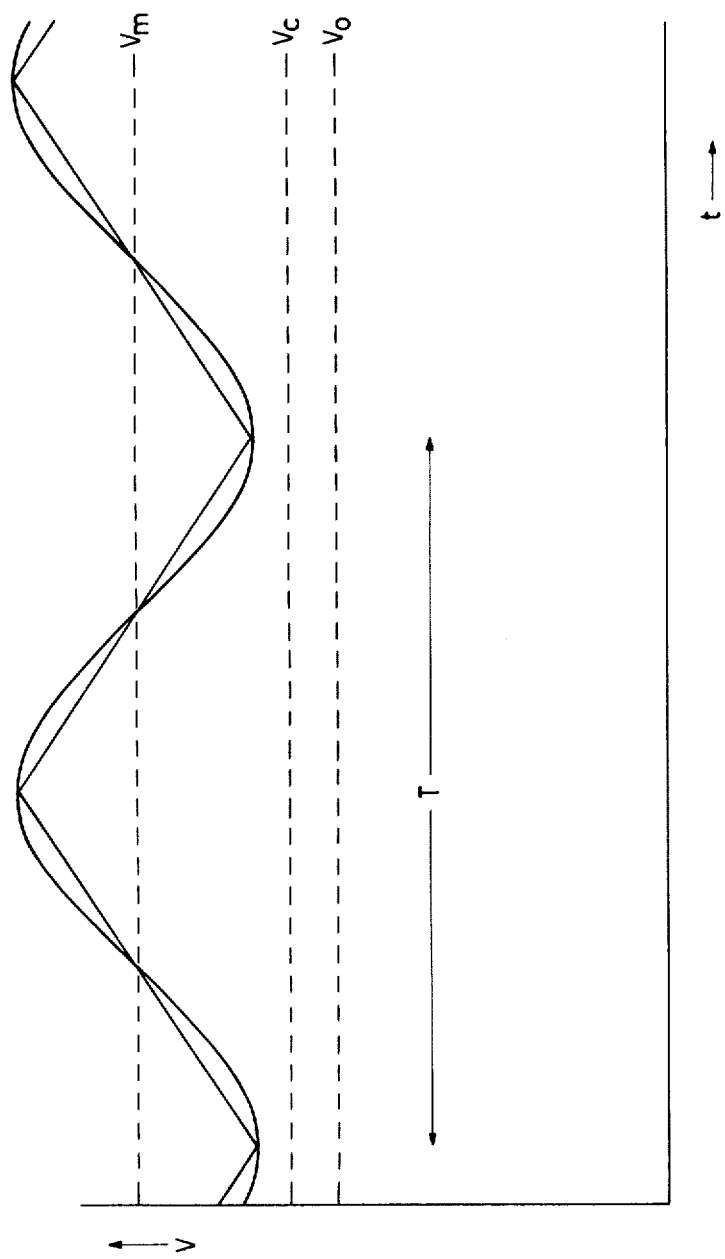
FIG. 2 illustrates a voltage characteristic of the first d.c. voltage source of said power supply unit.

An embodiment of a voltage-regulated power supply unit, according to the invention, which unit can be employed to greater advantage, is obtained if the smoothing filter in the rectifier circuit 6 is so dimensioned that a d.c. voltage provided with a ripple voltage is supplied by the first voltage source 1. In the presence of a ripple voltage on the output voltage of the rectifier circuit 6, voltage $V_m$, obtained by correcting this output voltage for the voltage drop $V_d$ across this rectifier, can be approximated by a triangular waveform, as shown in FIG. 2. This is applied in deriving formulae for the efficiency of a voltage-regulated power supply unit shown in FIG. 1.

FIG. 2 illustrates the situation in which the entire collector current $(aI_u)$ of the power transistor 7 is continuously being drawn from the first voltage source 1, in spite of the fluctuations about the output voltage of the rectifier circuit 6. Under this condition, which may be reduced to $(1-c)V_m \geq V_c$ where $c$ is the ripple factor, and applying the formula of FIG. 3A, the relationship of FIG. 3D for the efficiency $\eta$ of a voltage-regulated power supply unit as given in FIG. 1 can be derived. In this relationship the function $V_t = (1 - c)V_m + 4cV_m \cdot T^{-1} \cdot t$, where $t$ is a variable, represents the rising part of said triangular waveform within one period T. If the ripple voltage on the output voltage of the rectifier circuit 6 is such that the second voltage source 11 has to provide an additional supply of energy, which occurs when $V_o < (1-c)V_m < V_c$ and $(1+c)V_m \geq V_c$, the efficiency $\eta$ given in FIG. 3E can be derived by applying the formulae of FIGS. 3A - 3B. In the formula of FIG. 3E, $\tau_c$ is that part of the time duration ½T during which the additional supply of energy is required; this time duration (½T) corresponds with a rising part of the triangular waveform.

If the rectifier output voltage, provided with a ripple voltage, is such that at the maximum value of this output voltage the entire collector current of the transistor 7 is drawn from the first voltage source 1, but at a minimum value of said output voltage this current is drawn entirely from the second voltage source 11, the efficiency is composed of three terms, which are derived from the formulae of FIGS. 3A - 3C. Under such a condition, which may be reduced to the relationships: $(1-c)V_m \leq V_o$ and $(1+c)V_m \geq V_c$, the efficiency $\eta$ of the respective power supply unit is obtained as given by the formula of FIG. 3F, where $\tau_o$ is that part of the time duration(½T) corresponding to a rising part of the triangular waveform during which the collector current $(aI_u)$ is being drawn from the second voltage source 11 only (this time duration ½T corresponds with a rising part of the triangular waveform). Similarly, if $(1-c)V_m \leq V_o$ and $V_o < (1+c)V_m < V_c$, where the entire collector current $(aI_u)$ or a part thereof is thus drawn in turn from the second voltage source 11, an efficiency $\eta$ is obtained as given by the formula of FIG. 3G. In case the entire collector current $aI_u$ is continuously being drawn from the second voltage source 11, thus $(1+c)V_m < V_o$, the efficiency $\eta$ is given by the formula of FIG. 3H.

In FIG. 4 the solid line represents a characteristic of the efficiency of a voltage-regulated power supply unit according to the invention. This characteristic is obtained with the aid of the formulae of FIGS. 3D - 3H, while in addition to the aforementioned parameter values also a ripple factor of 14 percent is applicable. On comparing the two efficiency characteristics in FIG. 4, it is noted that in the presence of a ripple voltage on the output voltage of the rectifier circuit, the variation in the efficiency is less pronounced than in the case when said output voltage is completely smoothed.

Statistical considerations as to the fluctuations in the AC supply voltage required for such a power supply unit will answer the question how the parameters, including the ripple factor c, should be selected in order to obtain the highest possible efficiency for said power supply unit.

What I claim is:

1. Voltage-regulated power supply unit a first and second voltage source producing a fluctuating d.c. voltage, a first and second regulator connected to the first and second voltage sources, respectively, a feedback circuit connected to the output of said first regulator, which feedback circuit comprises a first comparator providing a control voltage related to the difference between the output voltage of said first regulator and a first fixed reference voltage for regulating the output voltage, means including a power transistor whereby the second regulator establishes a connection between the second voltage source and the first regulator during the time when the second regulator is registering a voltage generated by the first voltage source, which voltage is below the sum value of the required minimum operating voltage of the first regulator and said output voltage, for the purpose of maintaining a d.c. voltage which is at least equal to said sum value and to be supplied to the first regulator, and a differential amplifier which supplies a control voltage to said power transistor which is derived from the difference voltage between the voltage applied to the input of the first regulator and a second fixed reference voltage.

2. Voltage-regulated power supply unit as claimed in claim 1 including means for maintaining the level of the instantaneous terminal voltage supplied by the second voltage source higher than that of the voltage generated by the first voltage source, said first voltage source including a rectifier and a filter dimensioned so that the variation in the efficiency of the supply unit is approximately inversely proportional to the dimensions of said filter with respect to the ripple factor.

3. Voltage-regulated power supply unit as claimed in claim 1, wherein said second reference voltage is derived direct from the output voltage of said supply unit.

4. Voltage-regulated power supply unit as claimed in claim 1, wherein the second regulator comprises a control amplifier, by means of which the control voltage derived from the differential amplifier is transformed to a control voltage for the power transistor of the second regulator.

5. A voltage regulated power supply comprising, a first DC voltage source that produces a fluctuating DC voltage with a given ripple factor, a second DC voltage source of a higher voltage than said first source, a first voltage regulator with its input connected to the output of the first voltage source and its output connected to a feedback circuit comprising a first comparator which compares the first regulator output voltage with a first fixed reference voltage to provide a first control voltage that adjusts the impedance of the first regulator to regulate the output voltage, a second voltage regulator with its input connected to the output of the second voltage source and including a second comparator for comparing the input voltage to the first regulator with a second reference voltage to provide a second control voltage which establishes a connection between the output of the second voltage source and the input of the first regulator via an amplifier element of the second regulator only at a time when the second comparator receives a voltage below a given voltage level required by the first regulator for proper operation thereof.

6. A power supply as claimed in claim 5 wherein the circuit parameters of the first voltage source are chosen so that the ripple factor of the fluctuating DC voltage produced by the first voltage source is approximately 14 percent.

7. A power supply as claimed in claim 5 wherein said second reference voltage is derived from the output voltage of the first voltage regulator and is applied to the second comparator via an integrating circuit.

8. A power supply as claimed in claim 5 wherein the first reference voltage is derived directly from the output of the second voltage source.

9. A power supply as claimed in claim 5 wherein the DC voltage supply for the second comparator is derived exclusively from the output of the second voltage source.

10. A power supply as claimed in claim 5 wherein the second voltage regulator includes a control amplifier supplied with first and second DC operating voltages derived from said first and second voltage sources, respectively, and means for coupling the second control voltage derived by the second comparator to a control input of said control amplifier.

* * * * *